US012639198B2

(12) United States Patent
Eisele et al.

(10) Patent No.: US 12,639,198 B2
(45) Date of Patent: May 26, 2026

(54) METHOD FOR THE AUTOMATED PERFORMANCE OF SOFTWARE TESTS FOR A PROGRAM TO BE TESTED IN AN EMBEDDED SYSTEM

(71) Applicant: Robert Bosch GmbH, Stuttgart (DE)

(72) Inventors: Max Camillo Eisele, Ludwigsburg (DE); Robert Stark, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 253 days.

(21) Appl. No.: 18/495,398

(22) Filed: Oct. 26, 2023

(65) Prior Publication Data

US 2024/0143489 A1 May 2, 2024

(30) Foreign Application Priority Data

Oct. 31, 2022 (DE) ..................... 10 2022 211 509.0

(51) Int. Cl.
*G06F 11/3668* (2025.01)

(52) U.S. Cl.
CPC ...... *G06F 11/3688* (2013.01); *G06F 11/3696* (2013.01)

(58) Field of Classification Search
CPC ............. G06F 11/3688; G06F 11/3696; G06F 11/3692; G06F 11/3676; G06F 11/3684
See application file for complete search history.

(56) References Cited

U.S. PATENT DOCUMENTS

| | | | |
|---|---|---|---|
| 2006/0190239 A1* | 8/2006 | Piper ..................... | G06F 30/398 703/26 |
| 2016/0259943 A1* | 9/2016 | Murthy .................... | G06F 8/65 |
| 2020/0301813 A1* | 9/2020 | Mola ................... | G06F 11/3696 |
| 2021/0026760 A1* | 1/2021 | Huth ................... | G06F 11/3684 |
| 2022/0164277 A1* | 5/2022 | Menashe ............. | G06F 11/3692 |
| 2023/0319050 A1* | 10/2023 | Beauchesne .......... | H04L 63/104 726/1 |

OTHER PUBLICATIONS

Chen et al. "EnFuzz: Ensemble Fuzzing with Seed Synchronization among Diverse Fuzzers." 28th USENIX Security Symposium, UNSENIX (2019); pp. 1967-1983.

(Continued)

*Primary Examiner* — Wei Y Mui
*Assistant Examiner* — Travis Viet Tran
(74) *Attorney, Agent, or Firm* — NORTON ROSE FULBRIGHT US LLP

(57) ABSTRACT

A method for the automated performance of software tests for a program to be tested in an embedded system. The method includes: ascertaining, using an emulation-based fuzzer, a program behavior of the program to be tested, wherein at least one emulation-based result is derived on this basis; ascertaining, using a hardware-based fuzzer, the program behavior of the program to be tested, wherein at least one hardware-based result is derived on this basis; providing, using a monitoring component, the derived results, wherein the emulation-based result is provided to the hardware-based fuzzer, and/or the hardware-based result is provided to the emulation-based fuzzer.

9 Claims, 3 Drawing Sheets

(56) References Cited

OTHER PUBLICATIONS

Eisele et al. "Embedded fuzzing: a review of challenges, tools, and solutions." SpringerOpen—Cybersecurity (2022); pp. 1-18.
Li et al. "μAFL: Non-intrusive Feedback-driven Fuzzing for Microcontroller Firmware." arXiv (2022); pp. 1-12.
Manes et al. "The Art, Science, and Engineering of Fuzzing: A Survey" arXiv (2019); pp. 1-21.
Muench et al. "Avatar 2: A Multi-target Orchestration Platform" Workshop on Binary Analysis Research (2019); pp. 1-11.
Scharnowski et al. "Fuzzware: Using Precise MMIO Modeling for Effective Firmware Fuzzing" 31st USENIX Security Symposium, UNSENIX (2022); pp. 1239-1256.

* cited by examiner

100 ascertain program behavior by emulation-based fuzzer — 101 ascertain program behavior by hardware-based fuzzer — 102 provide obtained results — 103 computer computer program — 10

20

METHOD FOR THE AUTOMATED PERFORMANCE OF SOFTWARE TESTS FOR A PROGRAM TO BE TESTED IN AN EMBEDDED SYSTEM

FIELD

The present invention relates to the dynamic software testing method of "fuzzing", in particular to systems with limited access and transparency. In particular, the present invention relates to a method for the automated performance of software tests for a program to be tested in an embedded system. The present invention also relates to a computer program and to an apparatus for this purpose.

BACKGROUND INFORMATION

"Coverage-guided fuzzers" are described in the related art. Such fuzzers, such as American Fuzzy Loop (AFL), typically use static source code instrumentation to obtain feedback about the coverage of the target during the processing of a test input. In turn, for closed source targets, dynamic instrumentation can be used, i.e., the binary file to be tested is instrumented during runtime without instrumentation being compiled into the target.

In embedded systems, static instrumentation is more difficult to achieve for the following reasons:

Typically, the fuzzer runs on a different machine. The coverage data must therefore be transmitted;

a whole system is tested, which typically consists of multiple components. The software can include third-party libraries and software components from other vendors or customers. If these components are supplied as binary files, they can be considered as closed source components that cannot be altered. Closed source components therefore cannot be instrumented by the compiler;

Static instrumentation increases code size, which can be critical in limited embedded systems, i.e., there is not enough memory for instrumentation or additional functionalities that supports fuzzing.

Further, one drawback with hardware-based approaches of fuzzing is that they can be slow and do not scale well. Peripheral modeling approaches can fail at difficult-to-solve points in the hardware and can lead to false positives. The hardware in the loop is a big bottleneck because all of the context data must be exchanged between the hardware and the emulator for every single Input/Output (IO) request.

SUMMARY

The present invention relates to a method for the automated performance of software tests for a program to be test in an embedded system, a computer program, and an apparatus. Features and details of the present invention will emerge from the disclosure herein. Features and details described in the context of the method according to the present invention also apply, of course, in the context of the computer program according to the present invention and the apparatus according to the present invention, and respectively vice versa, so mutual reference is or can always be made with respect to the disclosure of the individual aspects of the present invention.

Fuzzing, also known as fuzz testing, is an automated software testing technique. In particular, invalid, unexpected, or random data is input into a program for testing during fuzzing. The program can then be monitored for exceptions such as crashes, failed built-in code assertions, or potential memory leaks.

It is possible for a fuzzer to be used for testing programs, in which case the programs process structured inputs. This structure can, e.g., be specified in a particular format or protocol. The structure can be provided to distinguish valid from invalid inputs. For example, a fuzzer can generate semi-valid inputs that are "valid enough" to not be rejected directly by the parser, but which produce unexpected behaviors in the program and are "invalid enough" to uncover corner cases that have not been dealt with properly.

The present invention can be based on various fuzzing approaches. Chen et al. (see reference [1], which references are provided at the end of the present description) proposed the use of multiple fuzzers to compensate for the weaknesses of individual fuzzers. In one implementation, multiple fuzzers (i.e., an ensemble) periodically synchronize their corpus so that every other fuzzer learns new, uncovered paths. These authors have shown that, at the same processing power, a fuzzing ensemble always finds new path coverages at least as well as a group of the same fuzzers. Another approach is to execute the software of the emulated system in a system emulator such as QEMU. It takes advantage of the emulator transparency to gather feedback for the fuzzing. Unfortunately, configuring an emulator for a particular goal can mean a tremendous amount of work. This is because the embedded SW is typically dependent on the availability of external components such as sensors and actuators. If these components are absent in the emulator, the SW will most likely take other paths and therefore cannot be compared to real world processes.

μAFL [3], for example, enables fuzzing for ARM-based microcontrollers via the embedded trace macrocell (ETM) hardware tracing interface. Most embedded fuzzing approaches utilize emulation to achieve more transparency about execution and potentially increase execution speeds [2]. However, it is difficult to configure an emulation for any arbitrary microcontroller because not only does the instruction set have to be emulated, but so do the expected hardware peripherals. Hardware in the loop (HiL) approaches such as Avatar2 [5] provide a solution in which all IO requests are forwarded from the emulator to the hardware and the result is transmitted back. HiL obviously represents a big bottleneck. Peripheral modeling approaches try to solve this drawback by using the fuzzer to iteratively model hardware peripherals:

First, a large fuzz data buffer is obtained from the fuzzer before the emulation is started;

During each hardware peripheral address space (IO Read) read operation, a portion of the fuzz data is answered;

If the fuzz data buffer is depleted or stalled, the emulation will start again with newly generated fuzz data.

The coverage controller can inform the fuzzer when firmware code which has not yet been reached is executed. In this way, the fuzzer can learn which values it must answer at any point in time of the emulation for the firmware to be further executed. The fuzzer also models the peripheral devices. To achieve the best efficiency, the fuzzer should only answer values that trigger a different firmware behavior. For example, if a 32-bit value from the IO address space in the firmware is processed as Boolean, then a single bit of the fuzz data is sufficient to distinguish all possible execution paths. In principle, the amount of fuzz data required for each IO read operation must be minimized. The approaches to modeling the peripherals differ in how they translate the fuzz data into an IO reading process.

In addition, Fuzzware [6] uses, e.g., symbolic execution to determine how the values of IO readings are further processed by the hardware and how much fuzz data are needed for modeling.

The fuzzers used according to the present invention can be based on such conventional approaches. However, in contrast to conventional methods, a combination of fuzzers of different types can be provided. In the present context, the emulation-based fuzzer and the hardware-based fuzzer according to a method according to the present invention are, for reason of the combination, advantageously not only able to emulate hardware like an embedded system; they are also able to operate directly for fuzzing purposes as well. In other words, in the fuzzing according to the present invention, it can be mandatory to use real hardware and to operate and evaluate it via fuzzing. This enables testing of the functionality of the hardware and ensures reliable and safe operation of the hardware.

The hardware can be designed as an embedded system. The hardware and/or the hardware program to be tested can, e.g., be provided for operating a vehicle, e.g., a motor vehicle, and/or a passenger vehicle, and/or an autonomously driving vehicle. It is thus possible that the hardware can be integrated into a vehicle, e.g., as part of a vehicle electronic system, and/or as a control device or the like. It is also possible that the program to be tested is part of an assistance system, and/or an autonomous driving function, and/or a braking function of the vehicle. It can therefore be provided that the program to be tested actively controls the vehicle. The fuzzing or the execution of the software tests thereby also has an immediate influence on the operation and in particular the control of the vehicle.

In the context of the present invention, the terms "fuzzing" or "fuzz testing" are understood in particular to mean the automated process in which randomly generated inputs are sent to a fuzz target, and the response is observed. A "fuzzer" or a "fuzzing engine" can correspondingly be a program that automatically generates such inputs. These inputs are therefore neither connected to the program to be tested, nor are they instrumented. However, they are able to instrument code, generate test cases, and execute programs to be tested. Conventional examples are afl and libfuzzer.

A program in the form of, e.g., software or a function to be tested by fuzzing can be referred to as a "fuzz target" or, within the scope of the present invention, as a "program to be tested". A key feature of a fuzz target can be that it processes potentially untrustworthy inputs generated by the fuzzer during the fuzzing process.

A "fuzz test" can be referred to as the combined version of a fuzzer and a fuzz target. A fuzz target can then be instrumented code, the inputs of which are provided with a fuzzer. A fuzz test is thus executable. The fuzzer can also start, observe, and stop multiple running fuzz tests (generally hundreds or thousands per second), each with a slightly different input generated by the fuzzer. It is possible that at least one fuzz test is performed in the method according to the present invention.

A "test case" is in particular a specific input and a test run of a fuzz test. In order to ensure repeatability, remarkable runs (those pointing out new code paths or crashes) are usually stored, e.g., in the respective result according to the method according to the present invention. In this way, a specific test case with its corresponding input can also be executed on a fuzz target that is not connected to a fuzzer, i.e., a target in its release version. It is possible that the fuzzing according to the present invention can be executed using at least one test case.

The use of code coverage information (hereinafter also referred to as information about code coverage or abbreviated as "coverage information") can be referred to as "coverage-guided fuzzing" in the form of feedback during fuzzing in order to recognize whether an input has caused the execution of new code paths/blocks. In the method according to the present invention, it is possible that the respective results provided correspond to this feedback.

"Static instrumentation" can be understood to mean the insertion of instructions into a program in order to receive feedback concerning the execution. It is usually performed by the compiler and can, e.g., describe the code blocks achieved during execution. It is possible that static instrumentation is used in the method according to the present invention.

"Dynamic instrumentation" can be described as controlling the execution of a program during its runtime so as to obtain feedback about the execution in this manner. It is usually achieved using operating system functionalities or by using emulators. It is possible that dynamic instrumentation is used in the method according to the present invention, preferably for the emulation-based fuzzer.

An "embedded system" can typically consist of a single microcontroller that interacts directly with its environment via sensors, actuators, and digital interfaces, and is often designed for a particular task.

The present invention provides a method for the automated performance of software tests for a program to be tested, preferably an embedded system, in which method the following steps are performed, preferably sequentially in the order indicated. According to an example embodiment of the present invention, the following steps can also be performed repeatedly:

ascertaining, by means of an emulation-based and in particular embedded fuzzer, a program behavior of the program to be tested, wherein at least one emulation-based result is derived on this basis, ascertaining, by means of a hardware-based fuzzer, the program behavior of the program to be tested, wherein at least one hardware-based result is derived on this basis, providing, by means of a monitoring component, the resultant results, wherein the emulation-based result is provided to the hardware-based fuzzer, and/or the hardware-based result is provided to the emulation-based fuzzer, wherein the provision is preferably performed for synchronization of corpuses of the fuzzers.

In other words, the emulation-based fuzzer and the hardware-based fuzzer can be combined by providing the results, thus forming an ensemble. Both the monitoring component and the fuzzers can be part of a computer program and/or a software system. Furthermore, the synchronization of the corpus of one of the fuzzers with the other respective fuzzer can be performed periodically. The ascertainment of the program behavior can in each case preferably be in the context of a fuzzing, preferably a coverage-guided fuzzing.

In particular, one advantage of the present invention is that an ensemble can be provided by the hardware-based and the emulation-based, and in particular embedded, fuzzer. Synchronization and translation of the respective corpus, and therefore in particular of corpus files between the fuzzers, can be provided in this case.

Unlike traditional fuzzing of user programs, the suggested format of the fuzzers can differ. For example, in the hardware-based fuzzer, a corpus file represents an input that can be fed in through a single input interface. In the emulator-based fuzzer, in particular a peripheral modeling fuzzer, seed files can encode a series of input and/or output (short IO) answers that address all available input interfaces.

The ascertained program behavior can include a program failure such as a program crash, and/or a failing built-in code assertion, and/or a potential memory leak. It is also possible that the ascertained program behavior includes a determination of a new code coverage, i.e., the determination that a previously unexecuted program code of the program has been executed and possibly caused the program failure.

It is possible that, by providing the results, each of the fuzzers can periodically synchronize its corpus with the other fuzzer so that the other respective fuzzer will learn a new code coverage, i.e., new, uncovered paths. The phrase "providing the respective results" can accordingly also be understood to mean that corpus files and/or seed files are exchanged between the fuzzers.

According to an example embodiment of the present invention, it can further be provided that the emulation-based fuzzer provides an emulator-based fuzzing as a result of the embedded system being emulated by means of an emulator, and the fuzzing is performed on the program to be tested, which program is executed by the emulator, in order to obtain the emulation-based result. For example, when the program failure is ascertained, the result can include information as to which input triggered the program failure. It is also possible that the result will contain an indication of a code coverage.

According to an example embodiment of the present invention, it is also advantageous for the hardware-based fuzzer to provide a hardware-based fuzzing as a result of providing at least one hardware interface for the embedded system and performing the fuzzing on the program to be tested, which program is executed by the embedded system, in order to obtain the hardware-based result, preferably via the hardware interface. For example, when the program failure is ascertained, the result can include information as to which input triggered the program failure. It is also possible that the result will contain an indication of a code coverage.

Optionally, according to an example embodiment of the present invention, it can be provided that the ascertainment, by means of the emulation-based fuzzer, of the program behavior of the program to be tested comprises the following steps:

executing the program to be tested based on an emulation of the embedded system, i.e., by the emulator,
  performing a simulation of at least one input and/or output interface for the emulation,
  performing an input, preferably defined by a corpus file and/or a seed specification, via the simulated at least one input and/or output interface,
  recognizing a specific program behavior in response to the input, preferably a program behavior that causes a new code coverage,
  providing the emulation-based result when the specific program behavior has been recognized, the emulation-based result comprising: information concerning the input, and/or the new code coverage, and/or a translated seed specification.

The seed specification can, e.g., be provided in the form of a seed file. The specific program behavior can in particular be the program failure described hereinabove.

According to an example embodiment of the present invention, it is also possible that the emulation-based result includes a translation of the input, preferably of the seed specification, for the hardware-based fuzzer in order to provide the translated input for the hardware-based fuzzer, said input then being used by the hardware-based fuzzer and/or manipulated in order to create further inputs, in particular for the hardware-based fuzzing process. The hardware-based fuzzer can then use the emulation-based result in order to, e.g., perform the hardware-based fuzzing based on the input, preferably in order to further test the new code coverage.

Furthermore, in the context of the present invention, it is optionally possible for the ascertainment, by means the hardware-based fuzzer, of the program behavior of the program being tested, to include the following steps:

executing the program being tested on the embedded system, and thus executing it in a hardware-based manner in particular,
  performing an input, preferably defined by a corpus file and/or a seed specification, via at least one hardware interface for the embedded system,
  recognizing a specific program behavior in response to the input, preferably a program behavior that causes a new code coverage,
  providing the hardware-based result when the specific program behavior has been recognized, the hardware-based result comprising: information concerning the input, and/or the new code coverage, and/or a translated seed specification, and/or a record of an input, and/or output behavior of the system, preferably by ascertaining and/or recording read operations in an address space of the system, preferably by using break points.

The seed specification can, e.g., be provided in the form of a seed file. The specific program behavior can in particular be the program failure described hereinabove.

Within the scope of the present invention, it can be further provided that the hardware-based result comprises a translation of the input, preferably of the seed specification for the emulation-based fuzzer, in order to provide the translated input to the emulation-based fuzzer, said input then being used by the emulation-based fuzzer and/or manipulated in order to create further inputs, whereby preferably the emulation-based fuzzer comprises at least one functional extension in this regard for injecting input and/or output data which are specified by the hardware-based result and/or which were recorded via a hardware interface for the embedded system. The emulation-based fuzzer can then, e.g., use the hardware-based result to perform the emulation-based fuzzing based on the input, preferably in order to further test the new code coverage.

Moreover, in the context of the present invention, it is advantageous for the monitoring component to translate the emulation-based result for the hardware-based fuzzer in order to use the result in a hardware-based fuzzing process and/or to translate the hardware-based result for the emulation-based fuzzer in order to use the result in an emulation-based fuzzing. The translation can, e.g., be needed because the inputs of the respective fuzzers must, e.g., be performed differently due to the different interfaces. Therefore, address mapping can, e.g., be provided for the translation, in which input addresses of the hardware-based result are converted into the corresponding input addresses of the emulation-based fuzzing, and/or vice versa.

The present invention also relates to a computer program, in particular a computer program product, comprising instructions that, when the computer program is executed by a computer, prompt the computer to perform the method according to the present invention. The computer program according to the present invention thus brings with it the same advantages as have been described in detail with reference to a method according to the present invention.

The computer can, e.g., be designed as a data processing apparatus which executes the computer program. The computer can comprise at least one processor for executing the computer program. A non-volatile data memory can also be provided, in which the computer program can be stored and from which the computer program can be read by the processor for execution.

The present invention can also relate to a computer-readable storage medium which comprises the computer program according to the present invention. The storage medium is, e.g., designed as a data store, such as a hard drive and/or a non-volatile memory and/or a memory card. The storage medium can, e.g., be integrated into the computer.

A subject matter of the present invention is also an apparatus for data processing, which is configured to execute the method according to the present invention. The apparatus can, e.g., be designed as the computer performing the method according to the present invention.

The method according to the present invention can moreover also be designed as a computer-implemented method.

Further advantages, features, and details of the present invention will emerge from the following description, in which embodiment examples of the present invention are described in detail with reference to the figures. In this context, the features disclosed herein can each be essential to the present invention, individually or in any combination.

In the following figures, identical reference signs are used for identical technical features, even for different exemplary embodiments.

DETAILED DESCRIPTION OF EXAMPLE EMBODIMENTS

Exemplary embodiments of the present invention relating to the dynamic fuzzing software testing method are described hereinafter, in particular with systems with limited access and transparency. Fuzzing is, e.g., explained in more detail in a current study [4].

Figure 1:
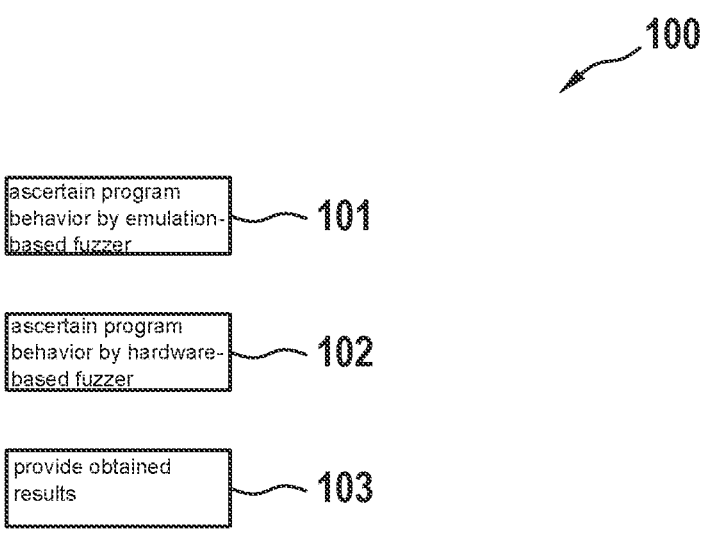
FIG. 1 shows example method steps of the method according to the present invention.
Figure 1:
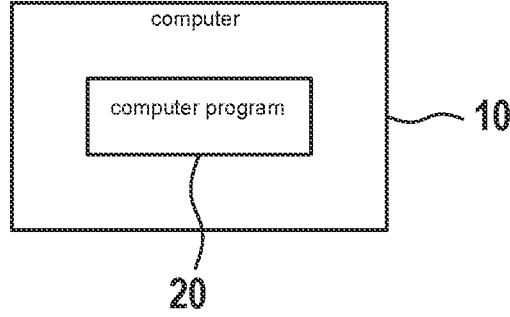

The method 100 shown in FIG. 1 according to an exemplary embodiment of the present invention can be provided for the automated performance of software tests in a program to be tested. The program is, e.g., provided for execution by an embedded system 540 illustrated in FIG. 3, which can be understood as a system with limited access and transparency. According to a first method step 101, an ascertainment of a program behavior of the program to be tested can be performed by an emulation-based fuzzer 300, resulting in at least one emulation-based result. Then, in a second method step 102, an ascertainment of the program behavior of the program to be tested can be performed by a hardware-based fuzzer 400, resulting in at least one hardware-based result. In a third method step 103, the obtained results can be provided by a monitoring component 500. In other words, the emulation-based result is provided to the hardware-based fuzzer 400 and/or the hardware-based result is provided to the emulation-based fuzzer 300.

The provision according to the third method step 103 can be provided as part of a synchronization of the fuzzers 300, 400. In this case, e.g., corpus files of the fuzzers 300, 400 are synchronized when one of the fuzzers 300, 400 has reached a new code coverage. To synchronize from the hardware-based fuzzer 400 to the emulation-based fuzzer 300, the corpus file can be replayed, and the IO behavior can be recorded in the process. A capturing of IO operations, if required, is further illustrated in FIG. 4. In the other direction, the input data of the input of the emulation-based fuzzer 300 which correspond to a desired input interface can, e.g., be extracted, and the sequence can be compiled into an input for the hardware-based fuzzer. In this way, a fast emulation and real execution of the actual hardware can be used to increase the overall performance of the fuzzer ensemble.

Also shown schematically in FIG. 1 is a computer program 20, which includes instructions that, when the computer program 20 is executed by a computer 10, cause the computer to perform method 100.

Figure 2:
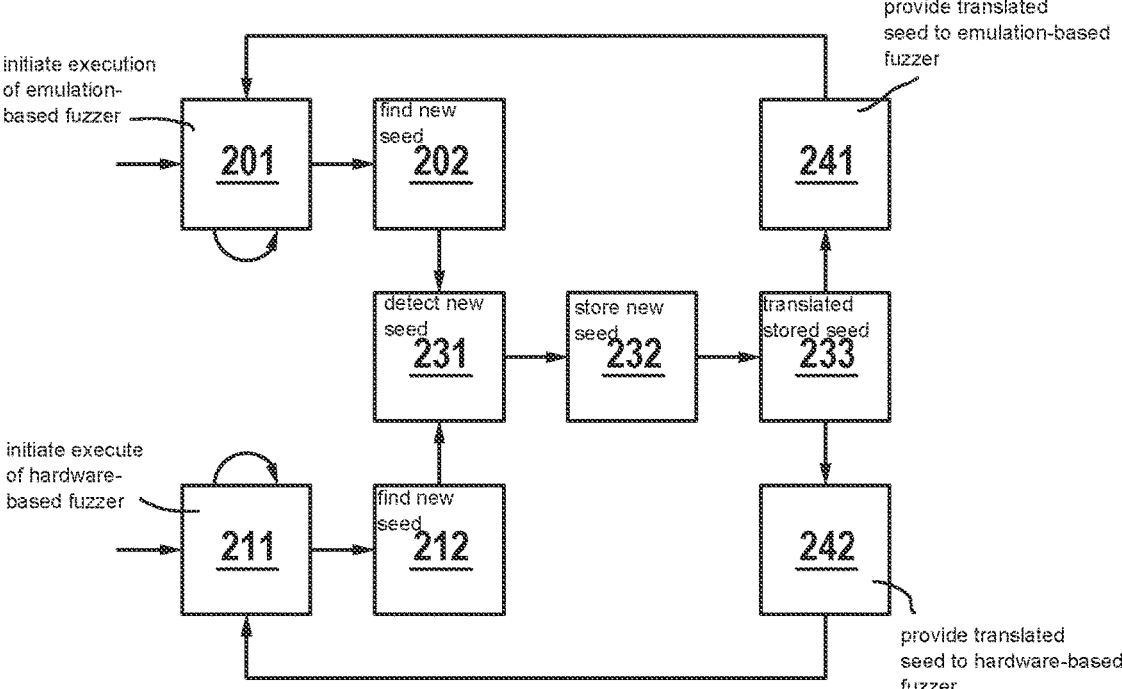
FIG. 2 schematically a hybrid fuzzing operation, in particular the synchronization between the hardware-based and the emulation-based fuzzer, according to an example embodiment of the present invention.

Further exemplary details of a method 100 according to the present invention are described in more detail hereinafter. The emulation- and hardware-based fuzzers 300, 400 are shown in greater detail in FIG. 3. In FIG. 2, the process for synchronizing the ensemble is illustrated, i.e., the combination of the emulation- and hardware-based fuzzer 300, 400.

The steps shown in FIG. 2 are performed by the components of the method 100 as follows: Steps 201 and 202 are performed by the emulation-based fuzzer 300, steps 211 and 212 are performed by the hardware-based fuzzer 400, and the remaining steps are performed by the monitoring component 500, hereinafter also referred to as the monitor. First, an execution of the emulation-based fuzzer is initiated in 201. Parallel to this, an execution of the hardware-based fuzzer is initiated in 211. During execution, in 202 the emulation-based fuzzer finds a new seed that includes a new code coverage. Also, at 212, the hardware-based fuzzer finds a new seed that causes a new code coverage. A seed is also referred to as a seed specification in the context of the present invention, and can include at least one input of the corresponding fuzzer. The monitor can detect the corresponding new seed at 231 and then store it at 232. It can be provided that the monitor at 232 stores the detected seed locally in a pool along with IO access information and coverage information. In 233, the monitor can then translate the stored seed using the stored IO access information and provide the translated seed to the emulation-based fuzzer (in 241) and/or to the hardware-based fuzzer (in 242).

Figure 3:
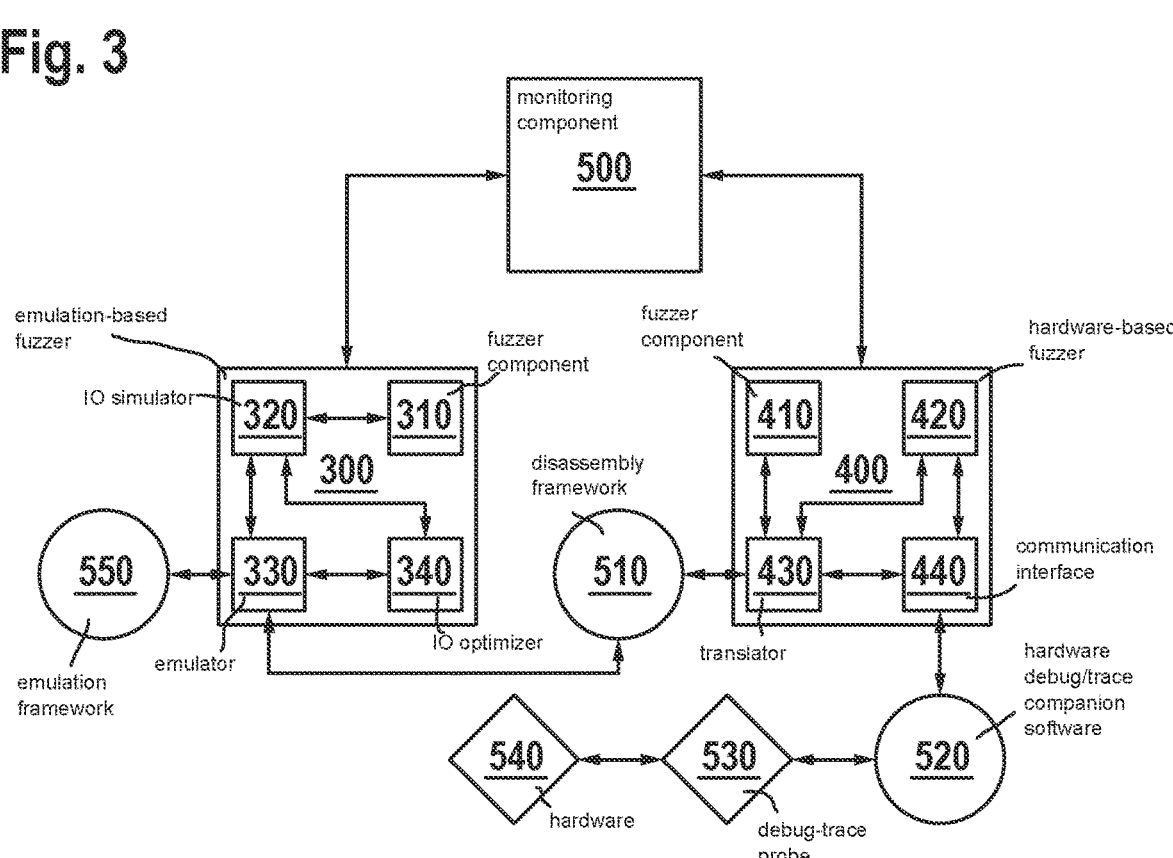
FIG. 3 further details of components involved and the connections therebetween, according to an example embodiment of the present invention.

From the illustration in FIG. 3 it becomes clear that a design of the proposed method 100, in particular identified as "hybrid ensemble fuzzing", comprises a connection between the hardware device and the emulator. An exemplary embodiment of the present invention can comprise a hardware-based fuzzer 400, an emulation-based fuzzer 300, and a monitor 500. The monitor 500 can for this purpose be designed to coordinate the execution of the two different fuzzers 300, 400. For this purpose, the monitor 500 can communicate with the hardware-based and the emulation-based fuzzer 300, 400 in order to capture the coverage information and, if necessary, distribute at least a portion of the fuzzing data used for the fuzzing (e.g., at least one input and/or seed specification). The emulation-based fuzzer 300 can be extended by features enabling the injection of partial IO data captured by the hardware via the monitor 500 for use during emulation. In addition, it can be provided that the emulation-based fuzzer 300 will report the attained code coverage to the monitor 500. The hardware-based fuzzer 400 can also report coverage data to the monitor 500. For newly found code coverages, the hardware-based fuzzer 400 can further record the exact IO behavior of the device being investigated, in particular a hardware means 540. This can, e.g., be accomplished by recognizing and remembering reading operations in the peripheral address space and recording the read IO data during a second execution using breakpoints.

As shown in FIG. 3, the emulation-based fuzzer 300 can comprise a fuzzer component 310, an IO simulator 320, an emulator 330, and an IO optimizer 340. The emulator 330 can be used to execute the program to be tested. The IO simulator can provide an input and/or output simulation to simulate input and/or output interfaces for the emulation. The fuzzer component 310 can be used to transmit input and/or output data to the input and/or output simulation. Further, the IO optimizer 340 can optimize the input and/or output simulation.

The hardware-based fuzzer 400 can also comprise a fuzzer component 410, but also a component 420 for IO data reading, a translator 430, and a communication interface 440. Communication interface 440 can be provided for communication with the hardware 540, i.e., the system 540. For example, a data link between the communication interface 440 and a hardware debug/trace companion software 520 can be used for this purpose. A debug-trace probe 530 can be controlled by the hardware debug/trace companion software 520, thus addressing the hardware 540.

The fuzzer component 410 can be used to provide a fuzzing input for the desired interface. The component 420 can read input and/or output data from the hardware 540. The translator 430 can translate the instruction trace into a program sequence and/or code coverage.

The translator 430 and the emulator 330 can also utilize a disassembly framework 510. Similarly, the emulator 330 can be in data communication with an emulation framework 550. Both the emulation- and the hardware-based fuzzers 300, 400 can communicate with the monitor 500.

Figure 4:
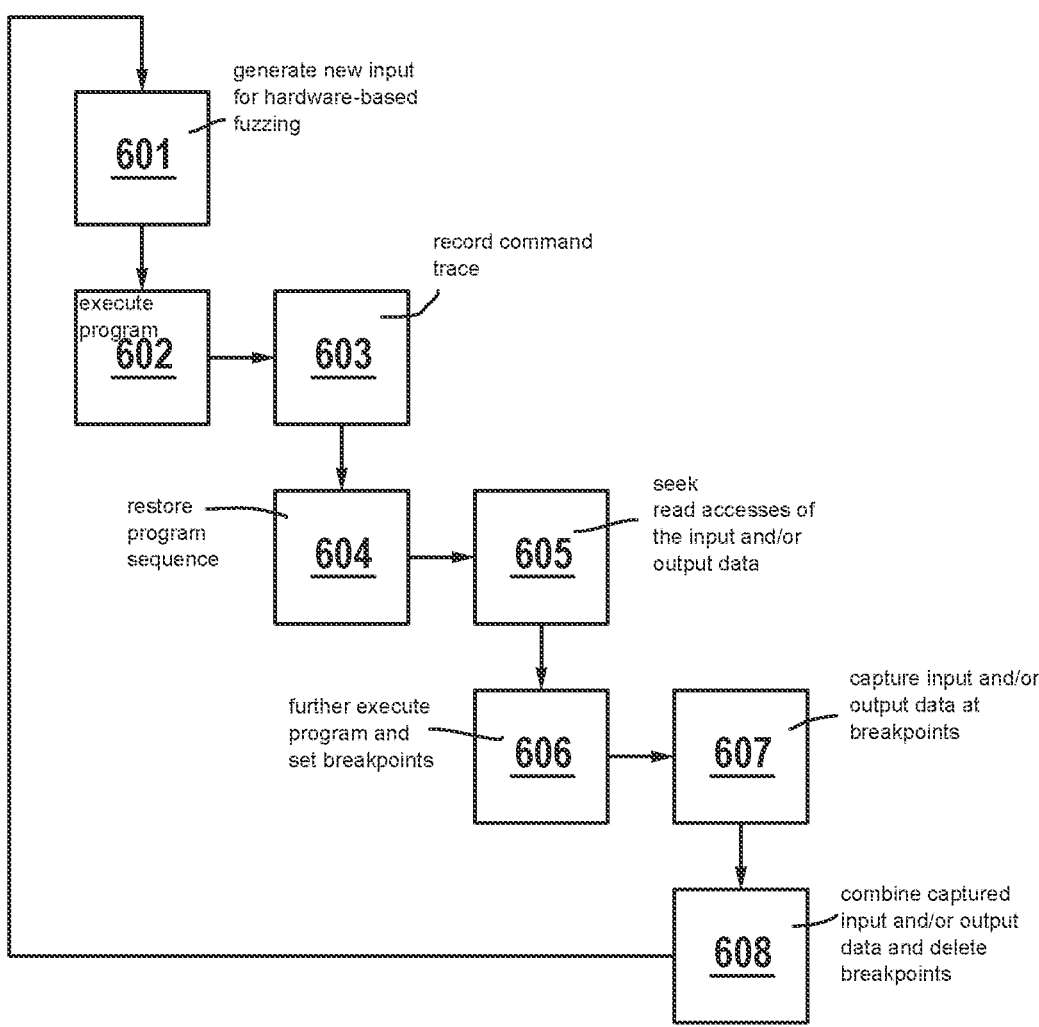
FIG. 4 shows a way to capture IO operations in the execution on the hardware, according to an example embodiment of the present invention.

Further exemplary method steps are shown in FIG. 4, which illustrate the reading of the input and/or output data at a hardware means 540. First, in 601, a new input for the hardware-based fuzzing of the program to be examined can be generated. In 602, the program is executed and, in 603, a command trace is recorded. In 604, the program sequence is restored and at 605, read accesses of the input and/or output data are sought. In 606, the program can then be further executed, and breakpoints can be set at the read accesses found. This enables the input and/or output data to be captured at the breakpoints in 607. In 608, the captured input and/or output data are then combined, and the breakpoints are deleted. The input and/or output data can then be provided in the hardware-based result of the fuzzing and/or can be synchronized with the emulation-based fuzzer 300.

The explanation hereinabove of the embodiments describes the present invention solely within the scope of examples. Of course, individual features of the embodiments can be freely combined with one another, if technically feasible, without leaving the scope of the present invention.

REFERENCES

[1] Yuanliang Chen, Yu Jiang, Fuchen Ma, Jie Liang, Mingzhe Wang, Chijin Zhou, Xun Jiao, and Zhuo Su. Enfuzz: Ensemble fuzzing with seed synchronization among diverse fuzzers. In $28^{th}$ {USENIX} Security Symposium ({USENIX} Security 19), pages 1967-1983, 2019.

[2] Max Eisele, Marcello Maugeri, Rachna Shriwas, Christopher Huth, and Giampaolo Bella. Embedded fuzzing: a review of challenges, tools, and solutions. Cybersecurity, 5(1):1-18, 2022.

[3] Wenqiang Li, Jiameng Shi, Fengjun Li, Jingqiang Lin, Wei Wang, and Le Guan. μ afl: Non-intrusive feedback-driven fuzzing for microcontroller firmware. arXiv preprint arXiv:2202.03013, 2022.

[4] Valentine-Jean Marie Manes, HyungSeok Han, Choong-woo Han, Sang Kil Cha, Manuel Egele, Edward J Schwartz, and Maverick Woo. The art, science, and engineering of fuzzing: A survey. IEEE Transactions on Software Engineering, 2019.

[5] Marius Muench, Dario Nisi, Aurelien Francillon, and Davide Balzarotti. Avatar 2: A multi-target orchestration platform. In Proc. Workshop Binary Anal. Res. (Colocated NDSS Symp.), volume 18, pages 1-11, 2018.

[6] Tobias Scharnowski, Nils Bars, Moritz Schloegel, Eric Gustafson, Marius Muench, Giovanni Vigna, Christopher Kruegel, Thorsten Holz, and Ali Abbasi. Fuzzware: Using precise {MMIO} modeling for effective firmware fuzzing. In $31^{st}$ USENIX Security Symposium (USENIX Security 22), pages 1239-1256, 2022.

The invention claimed is:

1. A method for an automated performance of software tests for a program to be tested in an embedded system, the method comprising the following steps:

ascertaining, using an emulation-based fuzzer, a program behavior of the program to be tested, wherein at least one emulation-based result is derived based on the program behavior ascertained using the emulation-based fuzzer;

ascertaining, using a hardware-based fuzzer, the program behavior of the program to be tested, wherein at least one hardware-based result is derived based on the program behavior ascertained using the hardware-based fuzzer;

providing, using a monitoring component, the derived emulation-based result and the hardware-based result, wherein: (i) the emulation-based result is provided to the hardware-based fuzzer, and (ii) the hardware-based result is provided to the emulation-based fuzzer; and translating, using the monitoring component, the emulation-based result for the hardware-based fuzzer to use a translated emulation-based result in a hardware-based fuzzing process, and translating, using the monitoring component, the hardware-based result for the emulation-based fuzzer to use a translated hardware-based result in an emulation-based fuzzing process.

2. The method according to claim 1, wherein the emulation-based fuzzer provides an emulation-based fuzzing as a result of the embedded system being emulated using an emulator, and fuzzing is performed on the program to be tested, the program to be tested being executed by the emulator, to obtain the emulation-based result.

3. The method according to claim 1, wherein the hardware-based fuzzer provides a hardware-based fuzzing as a result of at least one hardware interface being provided to the embedded system, and fuzzing is performed on the program to be tested, the program to be tested being executed by the embedded system, to obtain the hardware-based result via the hardware interface.

4. The method according to claim 1, wherein, the ascertaining, using the emulation-based fuzzer, of the program behavior of the program to be tested, includes the following steps:

executing the program to be tested based on an emulation of the embedded system;

performing a simulation of at least one input and output interface for the emulation;

performing an input, defined by a corpus file and a seed specification, via the simulated at least one input and output interface;

recognizing a specific program behavior in response to the input, the specific program behavior including a program behavior that causes a new code coverage; and providing the emulation-based result when the specific program behavior has been recognized, wherein the emulation-based result includes: (i) information about the input, and (ii) information about the new code coverage, and (iii) a translated seed specification.

5. The method according to claim 4, wherein the emulation-based result includes a translation of the input, to provide the translated input to the hardware-based fuzzer, the input then being used by the hardware-based fuzzer and manipulated to create further inputs.

6. A method for an automated performance of software tests for a program to be tested in an embedded system, the method comprising the following steps:

ascertaining, using an emulation-based fuzzer, a program behavior of the program to be tested, wherein at least one emulation-based result is derived based on the program behavior ascertained using the emulation-based fuzzer;

ascertaining, using a hardware-based fuzzer, the program behavior of the program to be tested, wherein at least one hardware-based result is derived based on the program behavior ascertained using the hardware-based fuzzer;

providing, using a monitoring component, the derived emulation-based result and the hardware-based result, wherein: (i) the emulation-based result is provided to the hardware-based fuzzer, and/or (ii) the hardware-based result is provided to the emulation-based fuzzer;

wherein the ascertaining, using the hardware-based fuzzer, of the program behavior of the program to be tested includes the following steps:

executing the program to be tested on the embedded system;

performing an input, defined by a corpus file and/or a seed specification, via at least one hardware interface for the embedded system;

recognizing a specific program behavior in response to the input, the specific program behavior including the program behavior that causes a new code coverage; and providing the hardware-based result when the specific program behavior has been recognized, wherein the hardware-based result includes: (i) information concerning the input, and/or (ii) information concerning the new code coverage, and/or (iii) a translated seed specification, and/or (iv) a record of the input, and/or (v) output behavior of the embedded system, by ascertaining and/or recording reading operations in an address space of the embedded system, by use of breakpoints.

7. The method according to claim 6, wherein the hardware-based result includes a translation of the input, to the emulation-based fuzzer to provide the translated input to the emulation-based fuzzer, the input then being used by the emulation-based fuzzer and/or manipulated to create further inputs, wherein the emulation-based fuzzer includes at least one functional extension for injecting input and/or output data specified by the hardware-based result and/or recorded via the hardware interface for the embedded system.

8. A non-transitory computer-readable medium on which is stored a computer program including instructions for an automated performance of software tests for a program to be tested in an embedded system, the instructions, when executed by a computer, causing the computer to perform the following steps:

ascertaining, using an emulation-based fuzzer, a program behavior of the program to be tested, wherein at least one emulation-based result is derived based on the program behavior ascertained using the emulation-based fuzzer;

ascertaining, using a hardware-based fuzzer, the program behavior of the program to be tested, wherein at least one hardware-based result is derived based on the program behavior ascertained using the hardware-based fuzzer;

providing, using a monitoring component, the derived emulation-based result and the hardware-based result, wherein: (i) the emulation-based result is provided to the hardware-based fuzzer, and (ii) the hardware-based result is provided to the emulation-based fuzzer; and translating, using the monitoring component, the emulation-based result for the hardware-based fuzzer to use a translated emulation-based result in a hardware-based fuzzing process, and translating, using the monitoring component, the hardware-based result for the emulation-based fuzzer to use a translated hardware-based result in an emulation-based fuzzing process.

9. An apparatus for data processing, the apparatus being configured for an automated performance of software tests for a program to be tested in an embedded system, the apparatus configured to:

ascertain, using an emulation-based fuzzer, a program behavior of the program to be tested, wherein at least one emulation-based result is derived based on the program behavior ascertained using the emulation-based fuzzer;

ascertain, using a hardware-based fuzzer, the program behavior of the program to be tested, wherein at least one hardware-based result is derived based on the program behavior ascertained using the hardware-based fuzzer;

provide, using a monitoring component, the derived emulation-based result and the hardware-based result, wherein: (i) the emulation-based result is provided to the hardware-based fuzzer, and (ii) the hardware-based result is provided to the emulation-based fuzzer; and translate, using the monitoring component, the emulation-based result for the hardware-based fuzzer to use a translated emulation-based result in a hardware-based fuzzing process, and translate, using the monitoring component, the hardware-based result for the emulation-based fuzzer to use translated hardware-based result in an emulation-based fuzzing process.

* * * * *